(12) United States Patent
Vincenzo F.

(10) Patent No.: US 7,017,893 B1
(45) Date of Patent: Mar. 28, 2006

(54) PULL-TYPE SUSPENSION

(76) Inventor: Costa Vincenzo F., 15572 Computer La., Huntington Beach, CA (US) 92649

( * ) Notice: Subject to any disclaimer, the term of this patent is extended or adjusted under 35 U.S.C. 154(b) by 0 days.

(21) Appl. No.: 11/014,604

(22) Filed: Dec. 16, 2004

(51) Int. Cl.
*F16F 9/00* (2006.01)

(52) U.S. Cl. ............... 267/226; 267/34; 267/64.16; 267/64.25; 267/64.28; 188/304; 188/322.21

(58) Field of Classification Search ............ 267/34, 267/64.11, 64.16, 64.25, 64.26, 64.28, 226; 188/297, 304, 522.21

See application file for complete search history.

(56) References Cited

U.S. PATENT DOCUMENTS

| | | | | |
|---|---|---|---|---|
| 1,925,461 A | * | 9/1933 | Ridge | 293/134 |
| 4,345,748 A | * | 8/1982 | Wossner et al. | 267/226 |
| 5,248,131 A | * | 9/1993 | Jobelius | 267/64.11 |
| 6,422,542 B1 | * | 7/2002 | Gramss | 267/64.24 |

* cited by examiner

*Primary Examiner*—Devon C. Kramer
(74) *Attorney, Agent, or Firm*—Clement Cheng

(57) ABSTRACT

A suspension unit used in a pull type shock application is disclosed, whereby a main shaft passes completely through a damping fluid so that the shock absorber fluid is not compressed when the shock shaft is displaced. The shaft also acts on a compression spring by an additional piston on the shaft. A cylindrical outer housing provides two distinct air chambers. The pressurization of these air chambers alters the spring rate, preload of the suspension, and vehicle ride height.

13 Claims, 2 Drawing Sheets

PULL-TYPE SUSPENSION

FIELD OF THE INVENTION

This invention relates to motorcycles suspensions, and particularly to the suspension unit that includes the rear shock absorber, spring, damper and means for controlling vehicle ride height.

DISCUSSION OF RELATED ART

Typically the rear wheel of a motorcycle is held by a swingarm. The swingarm is held in the chassis by pivot bearings, allowing free movement of the swingarm around a pivot point on the motorcycle frame. The swingarm is then attached to a suspension unit, typically an arrangement of springs and dampeners. The wheel is free to follow road surface undulations as the vehicle traverses the road. The relative motion of the wheel and swingarm relative to the vehicle is controlled by the suspension unit.

A common method of mounting the suspension unit on custom motorcycles is to affix one end of the suspension unit to the lower portion of the swingarm and the other to the motorcycle frame near the engine. This is referred to as a "pull shock" type of mounting and results in a generally horizontal orientation of the suspension unit, allowing the suspension unit to be mounted out of the way underneath the transmission. As the rear wheel is forced up from the road, the swingarm extends the suspension unit, and as the wheel extends down towards the road the suspension unit compresses.

The pull shock mounting system is contrary to that of most other motor vehicles that vertically mount shock absorbers near the underside of the seat. Problems have arisen because most of the suspension units used in these under-pivot vehicles are based on these more-typical suspension units.

For example, standard automotive suspension units have a damper shaft inserted into a single fluid chamber. As a shock absorber of such a suspension unit is compressed, the shaft must displace the oil in the shock absorber. Typically a gas bag or some other means is provided to compensate for the change in volume of the oil chamber as the shock absorber shaft fills this volume. This means that as the dampener shaft compresses the fluid, the resistance experienced by the dampener shaft primarily results from the compressible gas bag, and not the dampening of the fluid. Conversely as the shock absorber extends the dampener compresses the fluid directly and so the resistance experienced by the dampener is relatively quite strong.

When such a shock absorber is installed in a pull shock type of mounting arrangement, and as the wheel compresses the shock absorber, the force from the dampener is quite large and as the wheel rebounds it is relatively light. As such, the motion of the wheel is opposite to what is expected in a standard automotive shock absorber, due to the inverse nature of the pull shock type of mounting. Therefore, using a standard shock absorber in a pull shock type of mounting results in the motorcycle feeling harsh over bumps and wallowing on normal road.

A further drawback of typical shock absorbers in a pull shock type of mounting includes the inconvenience and cost of adding separate gas chamber. Such gas chambers are also prone to deflating, causing the performance of such shock absorbers to fade over time.

Another difficulty is the ability to alter the spring dampening strength with compressed air. In the past this has required the addition of special air bags or other air chambers. The concept of using a through shaft damper is not unique, as it is commonly used on steering dampeners. Others have used a shaft encased in a hollow cylinder to pull on a spring via a piston attached to a shaft. This spring arrangement has not been combined with a through shaft dampener, however.

Therefore, there is a need for a suspension unit that does not require a gas chamber or a gas bag to compensate for compression of the fluid due to shaft motion. Such a needed device would allow for easy adjustment of the vehicle ride height and provide consistent damping in either direction through use of an adjusting spring, and would not require separate pressurization means. Such an improved suspension would be easy to manufacture, and would provide for simplified use. The present invention accomplishes these and other objectives and advantages.

SUMMARY OF THE INVENTION

The present invention is a device for controlling the motion of the rear wheel of a motorcycle relative to the motorcycle frame. The suspension unit has a shaft that runs completely through a fluid chamber, a piston attached to the shaft to create damping in the fluid chamber, and a spring piston to control both a mechanical spring and to compress air on both sides of the spring piston. The fluid chamber piston includes a valve means that allows the fluid in the fluid chamber to flow from one side of the fluid chamber piston to the other in a controlled manner, whereby the maximum flow rate of the valve means controls the amount of dampening of the suspension unit. The suspension unit also provides an adequate structural for mounting the device to a motorcycle swingarm or other attachment point.

Although the use of air cylinders is well known, combining an air cylinder with a through shaft dampener and an external spring is unique. Given the significant drawback associated with the prior art it will become apparent that this new invention offers many significant advantages. The present device does not require a gas chamber or a gas bag to compensate for compression of the fluid due to shaft motion. Further, the present device allows for adjustment of the vehicle ride height and provides consistent damping in either direction through use of an adjusting spring, and does not require separate pressurization means. Such an improved suspension is relatively easy and inexpensive to manufacture, and provide for simplified use. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
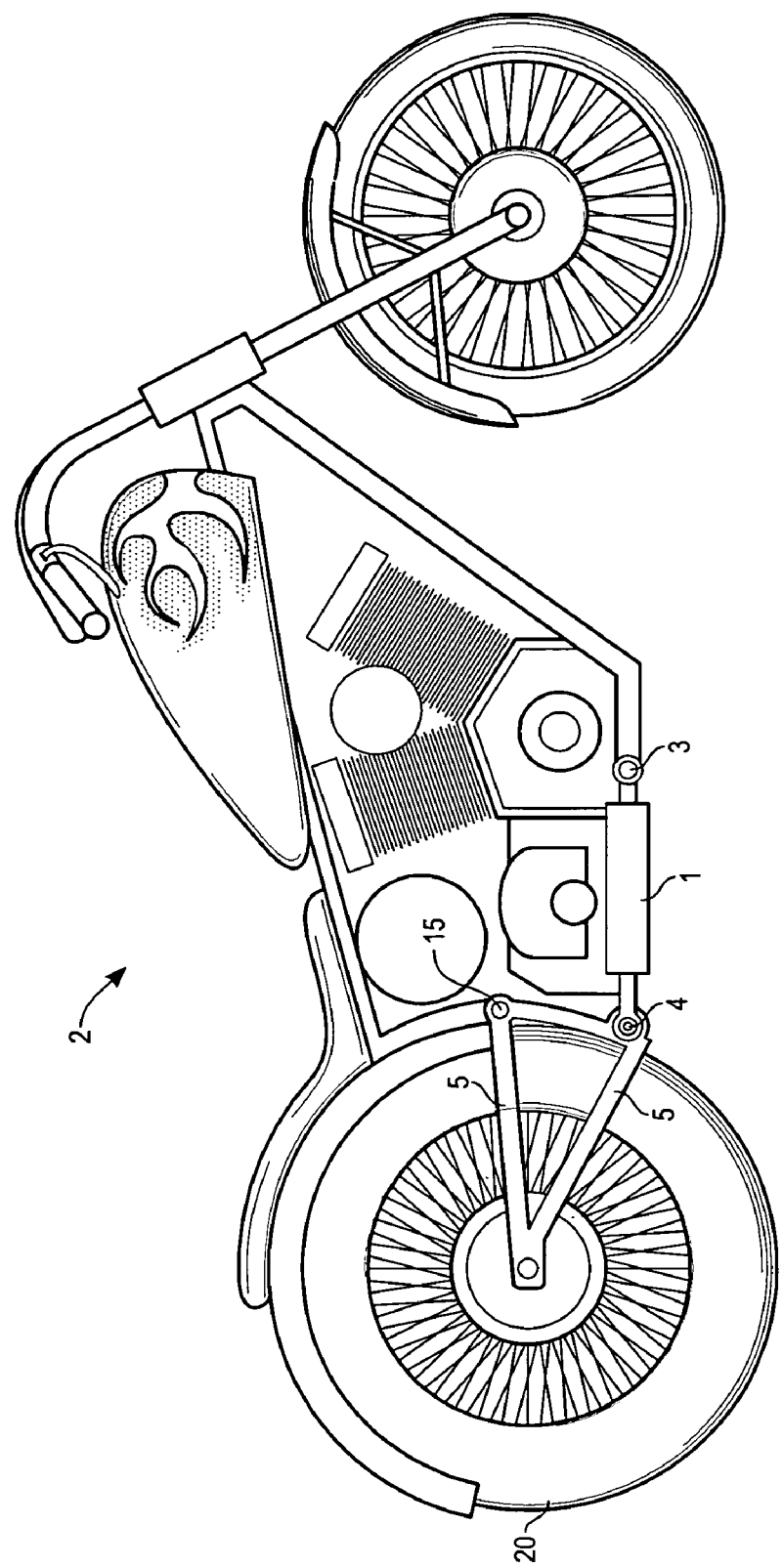
FIG. 1 is a side elevational view of the invention, illustrating the invention as mounted to a swingarm of a motorcycle.

The present invention embodies a number of features and innovations that make it useful as a suspension unit. FIG. 1 illustrates how the suspension unit is mounted in a motorcycle 2. The suspension unit 1 is attached to the swingarm 5 below a swingarm pivot 15 at a swingarm mount 4. As such, compression of a rear wheel 20 causes an extension of the suspension unit 1, and extension of the wheel away from the motorcycle 2 causes a compression of the suspension unit 1.

Figure 2:
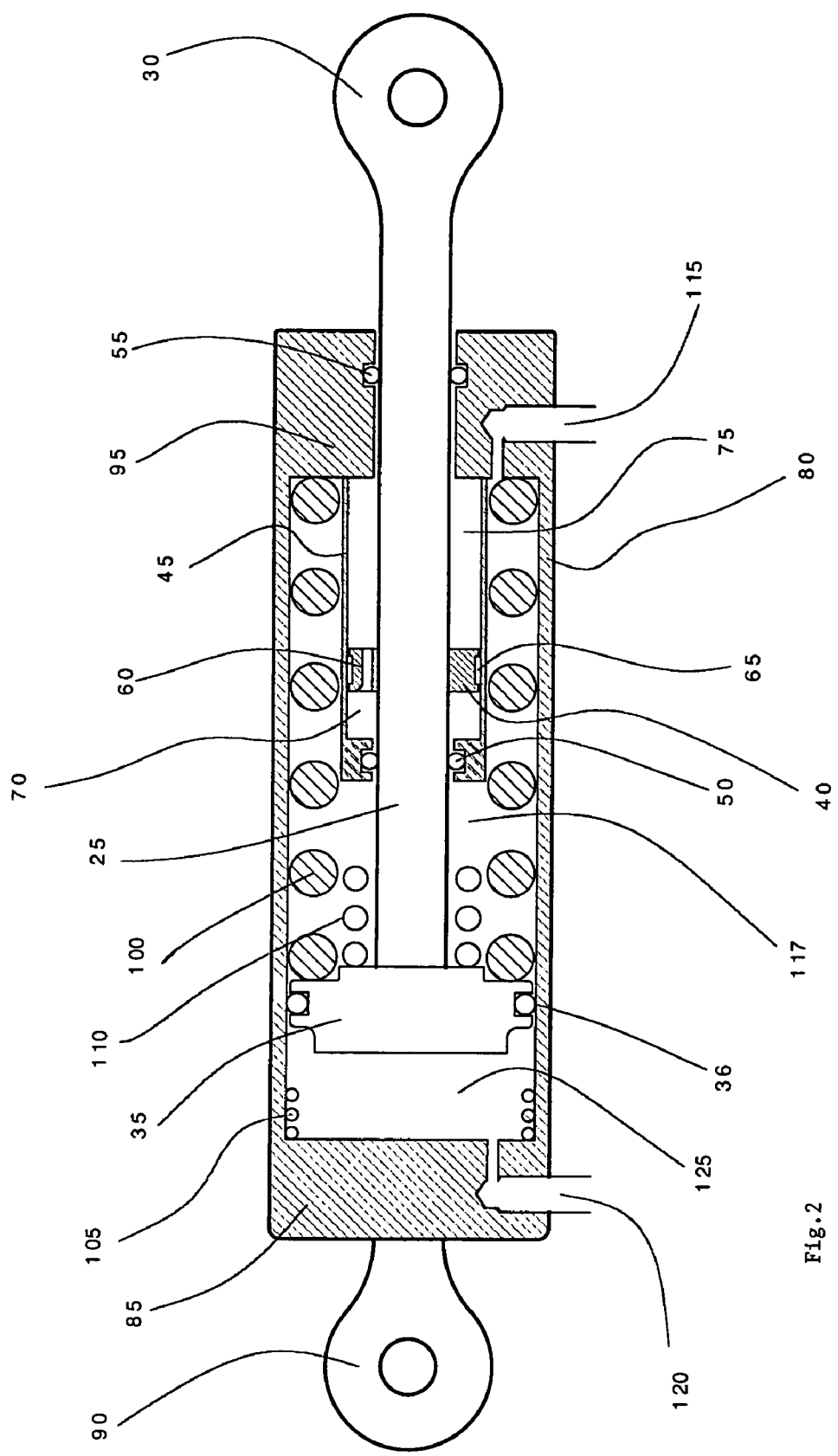
FIG. 2 is a cross-sectional view of the invention, taken generally along lines 2—2 of FIG. 1.

FIG. 2 shows the internal construction of the suspension unit 1, which comprises a shaft 25 having a connection fitting 30 at one end, which is a means for attaching the suspension unit 1 to a suspension mount 3 of the motorcycle 2. The suspension mount 3 may be any number of methods known to those skilled in the art. A clevis is typically used, but a stud post or other means may work just as well. It may also be noted that the suspension unit 1 works equally well with the connection fitting 30 attached to either the swingarm mount 4 or the main motorcycle mount 3.

At the other end of the shaft 25 is a spring piston 35. Typically there is a spring piston seal 36 on the spring piston 35 to restrict the transfer of fluid or gas past the spring piston 35.

Centrally located along and around the shaft is the damping piston 40, which may include a damping piston seal or bushing 65. The damping piston 40 is surrounded by an inner damping tube 45 which encases a non-compressible fluid (not shown) surrounding the damping piston 40.

The shaft 25 passes completely through the inner damping tube 45, and as such there is no displaced fluid as the shaft 25 strokes through the damping fluid. The damping fluid is contained inside the inner damping tube 45 by an inner shaft seal 50 at one end and an outer shaft seal 55 at the other end. The damping piston 40 typically includes one or more valve elements 60 for controlling the resistance of the damping piston 40 as it moves thru the damping fluid.

The damping piston 40 creates two separate fluid chambers in the inner tube 45. A rebound damping chamber 70 is formed between the inner shaft seal 50 and the damping piston 40, and a compression damping chamber 75 is formed between the damping piston 40 and the outer shaft seal 55 (FIG. 2).

An outer body 80 encases the spring piston 35 and includes an outer tube cap 85 at an end opposite to the shaft connector 30. An outer body connector 90 provides a means for connecting the outer body 80 to the suspension mounting point 4. The outer body connector 90 may be integrally formed with the outer body 80 or the outer tube cap 85. The means for mounting the outer body connector 90 to the suspension mounting point 4 may be any number of methods known in the prior art. A clevis is typically used, but a stud post or other joint may work just as well.

One advantage of the present invention is that it makes no difference whether the outer body connector 90 is attached to the suspension mounting point 4 and the shaft connector 30 is attached to the main motorcycle mount 3, or if the outer body connector 90 is attached to the main motorcycle mount 3 and the shaft connector 80 is attached to the suspension mounting point 4. The outer body 80 includes a spring support 95 opposite the outer tube cap 85, the spring support 95 for supporting a main spring 100 that lies between the spring piston 35 and the spring support 95. The main spring 100 may be of a coil type or other flexible material, such as an electrometric cylinder.

A top out spring 105 may be fitted between the spring piston 35 and the outer tube cap 85. The top out spring 105 may be of a coil type or other flexible material, such as an elastomeric cylinder. A bottom out spring 110 may also be included to augment the main spring 100. The bottom out spring 110 is positioned between the spring piston 35 and the spring support 95. The load path between the bottom out spring 110 and the spring support 95 may pass thru the inner damping tube 45. The bottom out spring 110 begins to experience compression only when the shaft 25 is mostly extended from the outer body 80. The bottom out spring 110 may be of a coil type or other flexible material, such as an electrometric cylinder.

A main chamber air inlet 115 is provided to allow the introduction of pressurized gas into a main chamber 117. The main chamber 117 is formed between the spring piston 35 and the spring support 95 and related structures. A top out chamber air inlet 120 is provided to allow the introduction of pressurized gas into a top out chamber 125, which is formed between the spring piston 35 and the outer tube cap 85. The spring piston seal 36 helps to maintain a pressure differential between the main chamber 117 and the top out chamber 125.

There are four modes of operation of the present invention. The first mode is when the wheel 20 hits a bump or other road surface (not shown) which causes the wheel 20 to compress towards the seat of the motorcycle 2. Because the suspension unit 1 is mounted below the pivot point 15, such movement of the wheel 20 causes the shaft 25 of the suspension unit 1 to extend out from the outer body 80. When the suspension unit 1 extends the main spring 100 is compressed, and the bottom out spring 110 may also be compressed, depending upon the severity of the impact to the wheel 20. The gas (or fluid) in the main chamber 117 is also compressed. The fluid in the compression-damping chamber 75 is forced past the damping piston 65 through the valve element 60 and into the rebound-damping chamber 70. The valve element 60 may be adjusted to provide the proper damping action.

The next mode of operation is the rebound mode. Typically, mode one compression damping is very light compared to the rebound mode. The rebound mode is active when the wheel 20 encounters a dip in the road and the wheel 20 falls away from the motorcycle 2. In this instance the suspension unit 1 is compressed, which allows the main spring 100 and the top out spring 110 to extend. The volume of the main chamber 117 is also increased, thus causing the pressure of the gas in the main chamber 117 to drop. This in turn reduces the force of the gas in the main chamber 117 against the spring piston 35. Conversely the gas in the top out chamber 125 is simultaneously compressed, causing the force within the top out chamber 125 to increase. The top out spring 105 may also be compressed in the event the compression force of the shaft 25 into the outer body 80 reaches a predetermined level. The combination of these forces prevents a sudden and undesirable "top out" of the spring piston 35 forcefully contacting the outer tube cap 85.

The third mode of operation occurs when compressed gas is introduced into the main chamber air inlet 115. This pressure exerts a force against the spring piston 35, causing the suspension unit 1 to contract. Because this is a pull type shock application, the contraction of the shock causes a seat (not shown) of the motorcycle 2 to rise with respect to the rear wheel 20. As such, the ride height of the motorcycle 2 may be controlled by the introduction of pressure to the main chamber 117.

The forth and final mode of operation occurs when compressed gas is introduced into the top out chamber air inlet 120. This pressure exerts a force on the spring piston 35 that causing the suspension unit 1 to expand, whereby the contraction of the shock causes the seat of the motorcycle to lower with respect to the rear wheel 20. In this way the ride height of the motorcycle may be controlled by the introduction of gas into the top out chamber 125.

The effect of simultaneously increasing the pressure in both the top out chamber 125 and main chamber 117 is to increase the net spring force of the suspension unit. Thus by controlling the pressure in the main and top out chambers 117,125 independently one can adjust both the ride height and spring rate of the motorcycle.

While a particular form of the invention has been illustrated and described, it will be apparent that various modifications can be made without departing from the spirit and scope of the invention. Accordingly, it is not intended that the invention be limited, except as by the appended claims.

The invention claimed is:

1. A suspension unit comprising:
a shaft with a spring piston at one end thereof, said shaft passing completely through an inner damping tube, an outer body encases the spring piston;
a damping piston connected to the shaft and positioned within the inner damping tube; and
a main spring positioned between the spring piston and a spring support attached at one end of the outer body; wherein both the spring piston and damping piston are affixed to the shaft;
a main chamber air inlet to allow introduction of pressurized gas between the spring piston and the spring support;
a top out chamber air inlet to allow the introduction of pressurized gas between the spring piston and an outer tube cap, the outer tube cap being attached to an end of an outer tube farthest from the inner damping tube.

2. The suspension unit of claim 1, further including:
on the shaft, a means for connecting to a suspension mounting point;
fluid within the inner damping tube, the fluid being prevented from escaping the inner damping tube by an inner shaft seal on the one end and an outer shaft seal on the other end;
at least one valve element on the damping piston, the valve element for regulating fluid flow between a rebound damping chamber formed between the damping piston and the inner shaft seal, and a compression damping chamber formed between the damping piston and the outer shaft seal; and
means for connecting the outer body to a suspension mounting point on the outer body opposite to a shaft connector.

3. The suspension unit of claim 2, further including a main chamber air inlet to allow the introduction of pressurized gas between the spring piston and the spring support.

4. The suspension unit of claim 2, further including a top out chamber air inlet to allow the introduction of pressurized gas between the spring piston and an outer tube cap, said outer tube cap being attached to the end of an outer tube farthest from the inner damping tube.

5. The suspension unit of claim 3, further including a top out chamber air inlet to allow the introduction of pressurized gas between the spring piston and an outer tube cap, said outer tube cap being attached to the end of an outer tube farthest from the inner damping tube.

6. A suspension unit comprising:
a shaft connectible at one end thereof to a suspension mounting point, a spring piston being positioned at the other end of the shaft, the spring piston including a seal for restricting the flow of gas across the piston, the shaft passing completely through an inner damping tube;
a damping piston connected to the shaft and positioned within the inner damping tube, the inner damping tube containing a fluid that is prevented from escaping from the inner damping tube by an inner shaft seal on one end of the inner damping tube and an outer shaft seal on the other end of the inner damping tube, the damping piston including at least one valve element for regulating fluid flow between a rebound damping chamber formed between the damping piston and the inner shaft seal and a compression damping chamber formed between the damping piston and the outer shaft seal;
an outer body encasing the spring piston;
a connector connecting the outer body to a suspension mounting point formed at the outer body opposite a shaft connector, the other end of the outer body contains a spring support for a main spring, the main spring positioned between the spring piston and the spring support;
a top out spring positioned between the spring piston and an outer tube cap attached to the end of the outer tube;
a bottom out spring positioned between the spring piston and the main spring support;
a main chamber air inlet to allow the introduction of pressurized gas between the spring piston and the spring support; and
a top out chamber air inlet to allow the introduction of pressurized gas between the spring piston and the outer tube cap.

7. A suspension unit comprising:
a shaft with a spring piston at one end thereof, said shaft passing completely through an inner damping tube, an outer body encases the spring piston;
a damping piston connected to the shaft and positioned within the inner damping tube; and
a main spring positioned between the spring piston and a spring support attached at one end of the outer body;
a main chamber air inlet to allow introduction of pressurized gas between the spring piston and the spring support; and
a top out chamber air inlet to allow the introduction of pressurized gas between the spring piston and an outer tube cap, the outer tube cap being attached to an end of an outer tube farthest from the inner damping tube.

8. A suspension unit comprising:
a shaft with a spring piston at one end thereof, said shaft passing completely through an inner damping tube, an outer body encases the spring piston;
a damping piston connected to the shaft and positioned within the inner damping tube; and
a main spring positioned between the spring piston and a spring support attached at one end of the outer body;
on the shaft, a means for connecting to a suspension mounting point;
fluid within the inner damping tube, the fluid being prevented from escaping the inner damping tube by an inner shaft seal on the one end and an outer shaft seal on the other end;
at least one valve element on the damping piston, the valve element for regulating fluid flow between a rebound damping chamber formed between the damping piston and the inner shaft seal, and a compression damping chamber formed between the damping piston and the outer shaft seal.

9. A suspension unit comprising:
a shaft with a spring piston at one end thereof, said shaft passing completely through an inner damping tube, so that during sliding, the shaft does not substantially compress damper fluid within the inner damping tube, wherein an outer body encases the spring piston;
a damping piston connected to the shaft and positioned within the inner damping tube; and
a main spring positioned between the spring piston and a spring support attached at one end of the outer body;
a main chamber air inlet to allow introduction of pressurized gas between the spring piston and the spring support;
a top out chamber air inlet to allow the introduction of pressurized gas between the spring piston and an outer tube cap the outer tube cap being attached to an end of an outer tube farthest from the inner damping tube.

10. The suspension unit of claim 9, further including:
on the shaft, a means for connecting to a suspension mounting point;
fluid within the inner damping tube, the fluid being prevented from escaping the inner damping tube by an inner shaft seal on the one end and an outer shaft seal on the other end;
at least one valve element on the damping piston, the valve element for regulating fluid flow between a rebound damping chamber formed between the damping piston and the inner shaft seal, and a compression damping chamber formed between the damping piston and the outer shaft seal; and
means for connecting the outer body to a suspension mounting point on the outer body opposite to a shaft connector.

11. The suspension unit of claim 10, further including a main chamber air inlet to allow the introduction of pressurized gas between the spring piston and the spring support.

12. The suspension unit of claim 10, further including a top out chamber air inlet to allow the introduction of pressurized gas between the spring piston and an outer tube cap, said outer tube cap being attached to the end of an outer tube farthest from the inner damping tube.

13. The suspension unit of claim 11, further including a top out chamber air inlet to allow the introduction of pressurized gas between the spring piston and an outer tube cap, said outer tube cap being attached to the end of an outer tube farthest from the inner damping tube.

* * * * *